(12) United States Patent
Kallin et al.

(10) Patent No.: US 9,537,730 B2
(45) Date of Patent: Jan. 3, 2017

(54) VIRTUAL NETWORK CONTROLLER

(75) Inventors: Sascha Kallin, München (DE); Franz Rambach, München (DE); Marco Hoffmann, München (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 176 days.

(21) Appl. No.: 13/496,503

(22) PCT Filed: Sep. 18, 2009

(86) PCT No.: PCT/EP2009/062110
§ 371 (c)(1),
(2), (4) Date: May 25, 2012

(87) PCT Pub. No.: WO2011/032595
PCT Pub. Date: Mar. 24, 2011

(65) Prior Publication Data
US 2012/0233302 A1   Sep. 13, 2012

(51) Int. Cl.
*H04L 12/24* (2006.01)
*H04L 12/911* (2013.01)
*H04L 12/919* (2013.01)

(52) U.S. Cl.
CPC ....... *H04L 41/5054* (2013.01); *H04L 41/5025* (2013.01); *H04L 47/72* (2013.01); *H04L 47/765* (2013.01); *H04L 47/781* (2013.01)

(58) Field of Classification Search
CPC .. G06F 2209/503; G06F 3/048; G06F 9/5077; H04L 41/5054
See application file for complete search history.

(56) References Cited

U.S. PATENT DOCUMENTS

| | | | |
|---|---|---|---|
| 7,058,947 B1 * | 6/2006 | Raja | G06F 9/5027 709/223 |
| 8,024,736 B1 * | 9/2011 | Graupner et al. | 718/104 |
| 2003/0033467 A1 | 2/2003 | Yoshizawa et al. | |
| 2003/0117954 A1 * | 6/2003 | De Neve et al. | 370/230 |
| 2003/0135609 A1 * | 7/2003 | Carlson et al. | 709/224 |

(Continued)

FOREIGN PATENT DOCUMENTS

| | | | | |
|---|---|---|---|---|
| EP | 1250780 B1 * | 10/2008 | | H04L 12/56 |
| WO | WO 03/001397 A1 | 1/2003 | | |
| WO | WO 2006/114713 A1 | 11/2006 | | |

OTHER PUBLICATIONS

International Search Report and Written Opinion corresponding to International Application No. PCT/EP2009/062110 dated Feb. 24, 2010.

*Primary Examiner* — Jerry Dennison
(74) *Attorney, Agent, or Firm* — Squire Patton Boggs (US) LLP

(57) ABSTRACT

A controller receives a request for the provision of a slice of a network to a virtual network operator. The controller determines whether the slice can be provided from existing resources, whether the slice can be provided if the existing resources are re-configured, or whether the slice can only be provided if additional resources are obtained. The controller then automatically takes the action required in order to provide the requested slice. The controller can also be used to release resources that are no longer required. Additionally, the controller can be used to re-optimize the network on request.

15 Claims, 6 Drawing Sheets

(56) References Cited

U.S. PATENT DOCUMENTS

| | | | |
|---|---|---|---|
| 2005/0102674 A1* | 5/2005 | Tameshige et al. | 718/100 |
| 2005/0129026 A1* | 6/2005 | Chang | H04L 29/06027 370/395.2 |
| 2005/0165925 A1* | 7/2005 | Dan et al. | 709/224 |
| 2006/0059565 A1* | 3/2006 | Green | G06F 9/50 726/27 |
| 2006/0072541 A1* | 4/2006 | Pecus | H04L 12/5695 370/351 |
| 2006/0143617 A1* | 6/2006 | Knauerhase et al. | 718/104 |
| 2006/0149611 A1* | 7/2006 | Diep | G06F 9/50 709/226 |
| 2006/0227810 A1* | 10/2006 | Childress et al. | 370/477 |
| 2007/0168171 A1* | 7/2007 | Frazier | G06F 9/5011 703/13 |
| 2008/0043679 A1* | 2/2008 | Karlsson | H04W 16/14 370/335 |
| 2008/0052718 A1* | 2/2008 | Hundscheidt | H04L 12/5695 718/104 |
| 2008/0059610 A1* | 3/2008 | Lin et al. | 709/220 |
| 2008/0080552 A1* | 4/2008 | Gates | H04L 12/66 370/468 |
| 2009/0271472 A1* | 10/2009 | Scheifler | G06F 9/485 709/202 |
| 2010/0077069 A1* | 3/2010 | Kim | G06F 9/5072 709/223 |
| 2010/0287280 A1* | 11/2010 | Sivan | G06F 9/5072 709/226 |

\* cited by examiner

VIRTUAL NETWORK CONTROLLER

The present invention is directed to network virtualization and to the provision of virtual network services.

FIG. 1 is a block diagram, indicated generally by the reference numeral 1, showing a system for providing network resources to users. The system 1 comprises an infrastructure provider 2, a network provider 4 and a user 6. The user 6 obtains network resources from the network provider 4. The network provider 4 obtains network resources from one or more infrastructure providers. The user could, for example, be an individual user, a service provider (with its own users), a company, or some other entity. The network resources can take many forms, including the provision of network access points, servers, storage devices, processors, routing mechanisms etc.

In the system 1, the network provider acts as a middleman between infrastructure providers and users. A network provider typically has contracts to provide network resources to multiple users, and additionally has contracts with one or more infrastructure providers to provide those resources.

There are, however, a number of ways in which the system 1 could be improved. For example, the system could be improved by enabling the network provider 4 to obtain and release resources from different infrastructure providers in a dynamic manner. This can add extra flexibility and also provides the potential for competition between infrastructure providers, which may lead to improved service levels and/or lower prices to the user 6 and would also enable potentially scarce network resources to be assigned as and when they are required. However, this level of additional flexibility increases the burden on the network provider 4.

The present invention seeks to address at least some of the problems outlined above.

In accordance with an aspect of the invention, there is provided an apparatus (such as a virtual network provider or a slice computation and management element) comprising: a first interface with one or more users (such as virtual network operators); a second interface with one or more infrastructure providers; and a computation engine (such as a slice computation engine) for allocating resources available from at least one of the one or more infrastructure providers to at least one of said one or more users, wherein on receipt of a request (typically from a user, such as a virtual network operator, and typically received via the first interface) for the provision of network resources, the computation engine is adapted to determine whether or not the requested network resources can be provided on the basis of an existing network configuration and, if so, to instruct a configuration element to provide the requested network resources. The first interface typically provides two-way communication between the apparatus and said one or more users. The second interface typically provides two-way communication between the apparatus and said one or more infrastructure providers.

In the event that the requested network resources cannot be provided on the basis of the existing network configuration, the computation engine may be adapted to determine whether or not the requested network resources could be provided on the basis of existing network resources if the said network configuration were re-configured. If so, the computation engine may be adapted to calculate a re-configuration of the network, instruct the configuration element to implement the reconfiguration of the network and instruct the configuration element to provide the requested network resources. Any such reconfiguration should be transparent to existing users. For example, existing service level agreements (SLAs) might be considered when calculating a reconfiguration of the network. A re-configuration of the network may be selected from one of several possible reconfigurations, in which case the computation engine may select the best option, which may be defined as being the cheapest available option.

In the event that the requested resources cannot be provided on the basis of the existing network resources, the computation engine may be adapted to determine extra resources required from at least one of said one or more infrastructure providers in order to provide the requested resources (the computation engine may determine an optimal solution or, if that is not possible, a near optimal solution), to request the provision of those resources by at least one of the one or more infrastructure providers and to instruct the configuration element to provide the requested network resources (for example, after the re-configuration of the network).

In some forms of the invention, determining extra resources required in order to provide the requested network resources includes determining whether the network resources need to be reallocated and, if so, instructing the reallocation of said network resources prior to instructing the provision of said requested network resources.

In some forms of the invention, determining whether the requested resources can be provided includes statistical multiplexing of network resources. Thus, in such an arrangement, the real network resources may be overbooked.

In some forms of the invention, the apparatus includes the said configuration element. The configuration element may be adapted to configure the resources allocated by the computation engine.

The apparatus may further comprise a customer interface. The request for the provision of said requested network resources may be received at said customer interface and may be received from a virtual network operator, or some other user.

The apparatus may further comprise a database. The step of determining whether or not the requested network resources can be provided on the basis of an existing network configuration may include checking details of the existing network configuration as stored in said database.

The invention may also include receiving a request (typically via the customer interface) to release at least some of the network resources provided to at least one of said one or more users (such as virtual network operators) and instructing the configuration element to release those resources. The request may be received from a virtual network operator, or some other user. The said computation engine may be adapted to reconfigure the network resources following the release of the said network resources.

Many embodiments of the present invention enable substantial resources to be made available to a user when required, but also save potentially scarce network resources by enabling those resources to be released when no longer required. The apparatus of the invention can be adapted to obtain and allocate resources automatically, i.e. without requiring input from a network engineer or the like. Of course, manual intervention is expensive. Further, the availability of engineers to provide such intervention is limited. Thus, an automated system should be more responsive, more reliable (at least in terms of availability), and cheaper.

In accordance with an aspect of the invention, there is provided a method comprising: receiving (for example at a customer interface) a request (typically from a user, such as a virtual network operator) for the provision of network resources obtained from one or more infrastructure providers to one or more users (for example to a virtual network operator); determining whether or not the requested network resources can be provided on the basis of an existing network configuration; and if the network resources can be provided on the basis of the existing network configuration, instructing a configuration element to provide the requested resources.

In some forms of the invention, the determination of whether requested network resources can be provided includes statistical multiplexing of network resources. In such an arrangement, the real network resources may be overbooked.

The method may further comprise determining, in the event that the requested network resources cannot be provided on the basis of the existing network configuration, whether or not the requested network resources could be provided on the basis of existing network configuration if the resources of the network configuration were re-configured; and if the network resources can be so provided, calculating a reconfigured network, instructing the configuration element to implement the reconfigured network and instructing the configuration element to provide the requested resources. A re-configuration of the network may be selected from one of several possible re-configurations of the network.

The method may further comprise: determining, in the event that the requested network resources cannot be provided on the basis of the existing network resources, extra resources required in order to provide the requested network resources; requesting the provision of said extra resources from at least one of said one or more infrastructure providers; and instructing the configuration element to provide the requested network resources. The invention may include re-configuring the network prior to the provision of the request network resources (thereby re-allocating/optimising the newly available resources). In some forms of the invention, extra network resources, or indeed other network resources, can be released back to the relevant infrastructure provider(s) when no longer required.

The step of determining whether or not the requested network resources can be provided on the basis of an existing network configuration may include checking details of the existing network configuration as stored in a database.

The invention may include receiving a request (typically via the customer interface) to release at least some of the network resources provided to one or more users and instructing the configuration element to release those resources. The request to release resources may be received from a user (e.g. a virtual network operator). The invention may include re-configuring the network resources following the release of the said network resources.

According to an aspect of the invention, there is provided a method comprising: receiving a request for the release of at least some network resources that are being provided to a user (such as a virtual network operator); instructing the release of the said network resources (such as by a configuration element); and re-configuring the network resources being provided to the user following the release of the said network resources. The method may additionally include one or more of the features discussed above.

According a further aspect of the invention, there is provided an apparatus (such as a virtual network provider or a slice computation and management element) comprising: a first interface with one or more users (such as virtual network operators); a second interface with one or more infrastructure providers; and a computation engine (such as a slice computation engine) for allocating resources available from at least one of the one or more infrastructure providers to at least one of said one or more users, wherein on receipt of a request for the release of at least some network resources that are being provided to a user (such as a virtual network operator), the computation engine instructs a configuration element to release the said network resources and re-configures the network resources being provided to the user following the release of the said network resources. The apparatus may additionally include one or more of the features discussed above.

In accordance with an aspect of the invention, there is provided a computer program product comprising: means for receiving (for example at a customer interface) a request (typically from a user, such as a virtual network operator) for the provision of network resources obtained from one or more infrastructure providers to one or more users (for example to a virtual network operator); means for determining whether or not the requested network resources can be provided on the basis of an existing network configuration; and means for instructing a configuration element to provide the requested resources, in the event that the network resources can be provided on the basis of the existing network configuration.

According to an aspect of the invention, there is provided a computer program product comprising: means for receiving a request for the release of at least some network resources that are being provided to a user (such as a virtual network operator); means for instructing the release of the said network resources (such as by a configuration element); and means for re-configuring the network resources being provided to the user following the release of the said network resources.

In accordance with an aspect of the invention, there is provided a computer program comprising: code for receiving (for example at a customer interface) a request (typically from a user, such as a virtual network operator) for the provision of network resources obtained from one or more infrastructure providers to one or more users (for example to a virtual network operator); code for determining whether or not the requested network resources can be provided on the basis of an existing network configuration; and code for instructing a configuration element to provide the requested resources, in the event that the network resources can be provided on the basis of the existing network configuration. The computer program may be a computer program product comprising a computer-readable medium bearing computer program code embodied therein for use with a computer.

According to an aspect of the invention, there is provided a computer program product comprising: code for receiving a request for the release of at least some network resources that are being provided to a user (such as a virtual network operator); code for instructing the release of the said network resources (such as by a configuration element); and code for re-configuring the network resources being provided to the user following the release of the said network resources. The computer program may be a computer program product comprising a computer-readable medium bearing computer program code embodied therein for use with a computer.

Exemplary embodiments of the invention are described below, by way of example only, with reference to the following numbered drawings.

Figure 2:
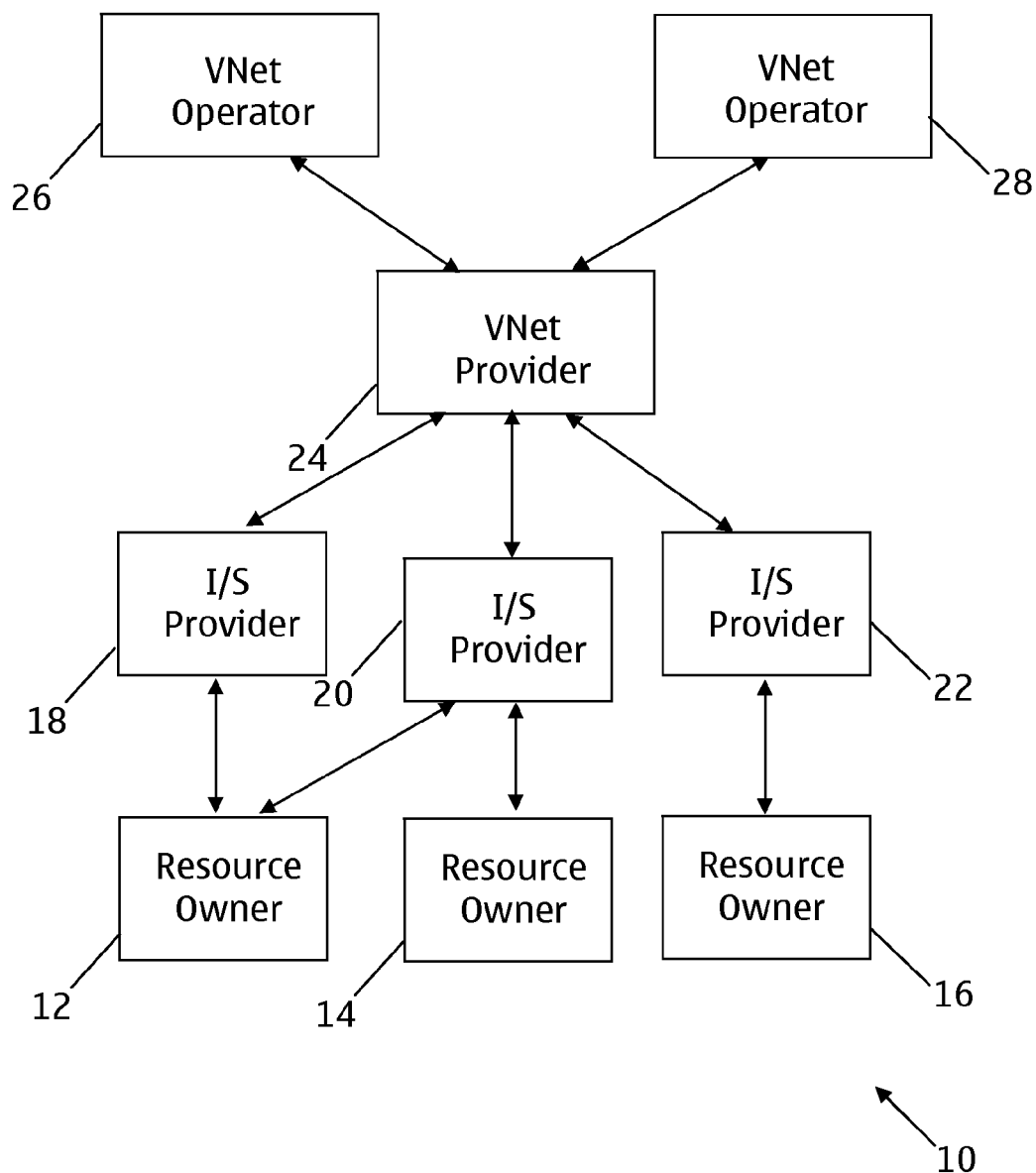
FIG. 2 is a block diagram of a system in accordance with an aspect of the present invention.

FIG. 2 is a block diagram, indicated generally by the reference numeral 10, of a system in accordance with an aspect of the present invention. The system 10 comprises first 12, second 14 and third 16 resource owners, first 18, second 20, and third 22 infrastructure providers, a virtual network provider 24 and first 26 and second 28 users (generally referred to below "virtual network operators"). The users may, for example, be individual users, service providers (with their own users), companies, other entities, or a combination of the above.

Thus the system 10 enables the virtual network provider 24 to provide a virtual network to one or more users (such as the virtual network operators 26 and 28). Network virtualization enables the separation between a virtual network provided to a virtual network operator and the underlying hardware. For the virtual network provider, this arrangement enables resources to be sold (or leased) to a number of different customers (i.e. virtual network operators). Network virtualization also means that a virtual network operator does not need to own and maintain hardware. A virtual network operator may, for example, obtain a full managed network from a virtual network provider, and provide services to others using that network.

In the system 10, the virtual network provider 24 does not own or directly control the hardware providing the network services to the user. The virtual network provider typically controls virtual resources, but not the actual hardware providing those virtual resources. The hardware is typically owned and operated by the resources owners 12, 14 and 16. In the system 10, the users 26 and 28 typically have contracts with the virtual network provider 24 for the provision of network services and the virtual network provider 24 has separate contracts with the infrastructure providers 18, 20 and 22.

The resources owners 12, 14 and 16 provide the basic (virtual) building blocks of the networks that will be provided to the virtual network operators 26 and 28. By way of example, the resource owners may provide wireline and wireless access and transport networks, storage devices, processors and servers. The resources owners 12, 14 and 16 provide network elements to the infrastructure providers 18, and 22 respectively. The infrastructure providers 18, 20 and 22 obtain resources from one or more of the resource owners and typically manage and control a physical network (e.g. provide the routing mechanisms between the resources).

Although each resource owner is generally shown connected to one (and only one) infrastructure provider, this is not essential. A particular resource owner (such as the resource owner 12) may provide network resources to more than one infrastructure provider and an infrastructure provider (such as infrastructure provider 20) may obtain network resources from more than one resource owner. Accordingly, the system 10 shown in FIG. 2 is a simplification.

Furthermore, at least some of the various business roles shown in FIG. 2 (resource owner, infrastructure provider and virtual network provider) may be combined.

Figure 1:
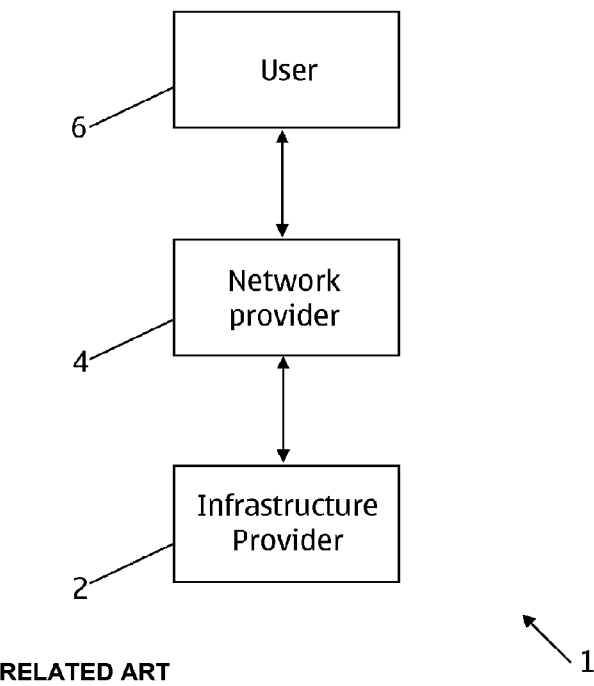
FIG. 1 is a block diagram of a known system for providing network services.
Figure 3:
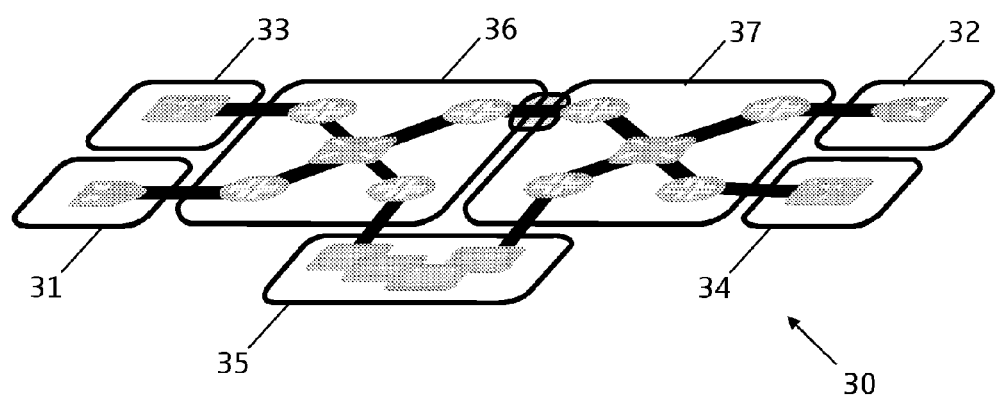
FIG. 3 shows resources provided in accordance with an aspect of the present invention.

FIG. 3 shows resources, indicated generally by the reference numeral 30, that might be provided by one or more of the resource owners 12, 14 and 16. The resources 30 consist of wireline access points 31 and 32, wireless access points 33 and 34, computing and storage resources 35, and transport and switching resources 36 and 37. Often, storage, routing and access point resources are each provided by different resource owners, although this is not essential to the present invention.

As described above with reference to FIG. 2, one or more infrastructure providers obtain resources from one or more resource owners. Any particular virtual network may include resources from multiple infrastructure providers. Similarly, a particular virtual network provider may provide resources to multiple virtual network operators. Moreover, the resources provided to any virtual network operator can change over time. Thus, resource can be dynamically re-assigned, as required. This is a significant advantage of virtual networks, compared with fixed networks.

Figure 4:
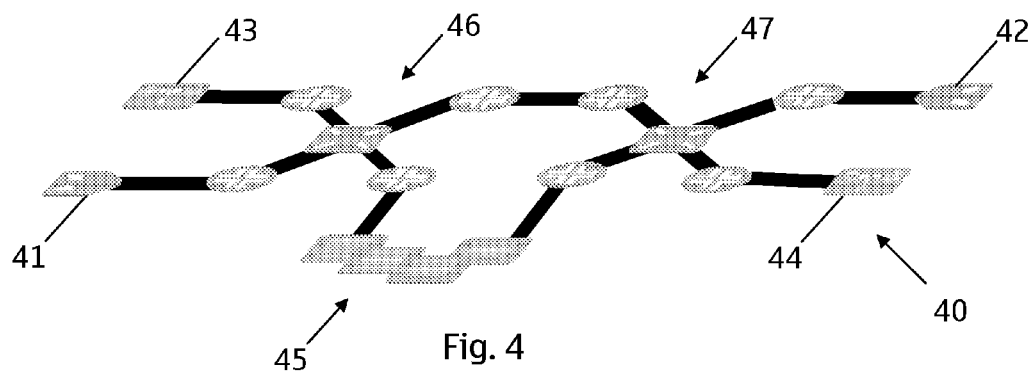
FIG. 4 shows resources provided in accordance with an aspect of the present invention.

FIG. 4 shows resources, indicated generally by the reference numeral 40, that might be obtained by an infrastructure provider from one or more of the resource owners. The resources 40 consist of wireline access points 41 and 42, wireless access points 43 and 44, computing and storage resources 45, and transport and switching resources 46 and 47. In the example shown in FIG. 4, the resources 40 are essentially the same as the resources 30, but the separation of the resources shown in FIG. 3 is no longer apparent. The resources as made available by the infrastructure providers 18, 20 and 22 hide the source of those resources. Thus, whilst FIG. 3 shows multiple resources provided by multiple resource owners, FIG. 4 shows one or more managed networks.

Figure 5:
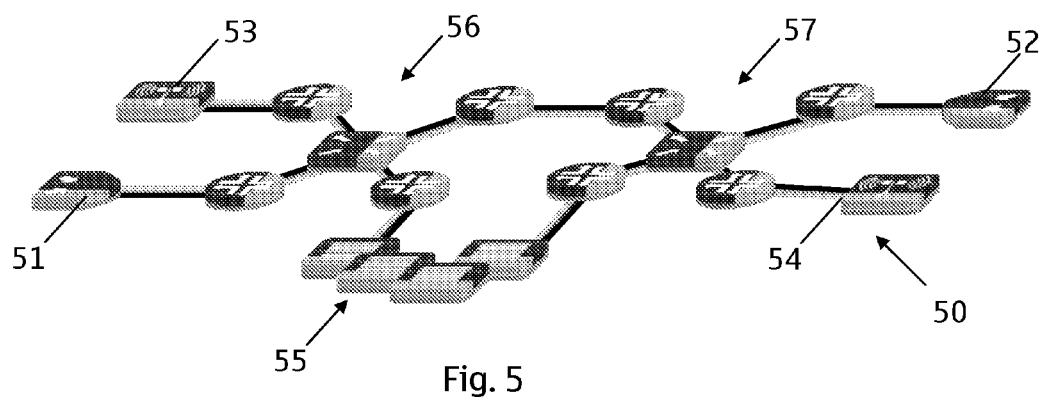
FIG. 5 shows resources provided in accordance with an aspect of the present invention.

FIG. 5 shows resources, indicated generally by the reference numeral 50, that might be made available by the virtual network provider 24. The resources 50 consist of wireline access points 51 and 52, wireless access points 53 and 54, computing and storage resources 55, and transport and switching resources 56 and 57. Thus, the virtual network provider 24 is able to combine virtual resources from one or more of the infrastructure providers 18, 20 and 22. Furthermore, the virtual network provider 24 is able to split the resources into different slices on request from one or more virtual network operators. Thus, the virtual network provider 24 may allocate resources (such as the resources 40 provided by an infrastructure provider) between more than one virtual network operator. This is represented in FIG. 5 by the shading of the resources 50 that show that those resources are made available to more than one virtual network operator (i.e. the resources 50 are split between different network slices).

Figure 6:
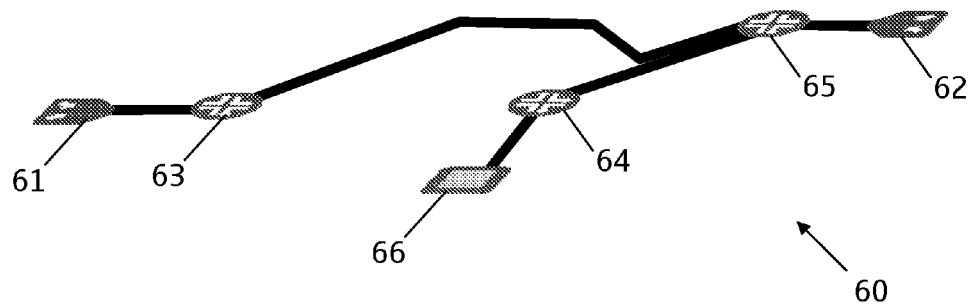
FIG. 6 shows resources provided in accordance with an aspect of the present invention.

The virtual network operators 26 and 28 make use of the resources provided by the virtual network provider 24. FIG. 6 shows a slice, indicated generally by the reference numeral 60, allocated to an exemplary virtual network operator 26. The resources included in the slice 60 comprise wireline access points 61 and 62, routing/switching element 63, 64 and 65, and computing resource 66 (such as a server). By comparing the resources included in the slice 60 with the resources 30 shown in FIG. 3, it can be seen that the virtual elements allocated to the virtual network operator 26 by the virtual network provider 24 are provided to the virtual network provider by the resources owners.

The present invention enables the automation of the combination of resources of different infrastructure providers to one network, with that network being managed and controlled by a single virtual network provider, as well as the automation of the splitting of the network resources into different slices, on request from one or more virtual network operators.

Figure 7:
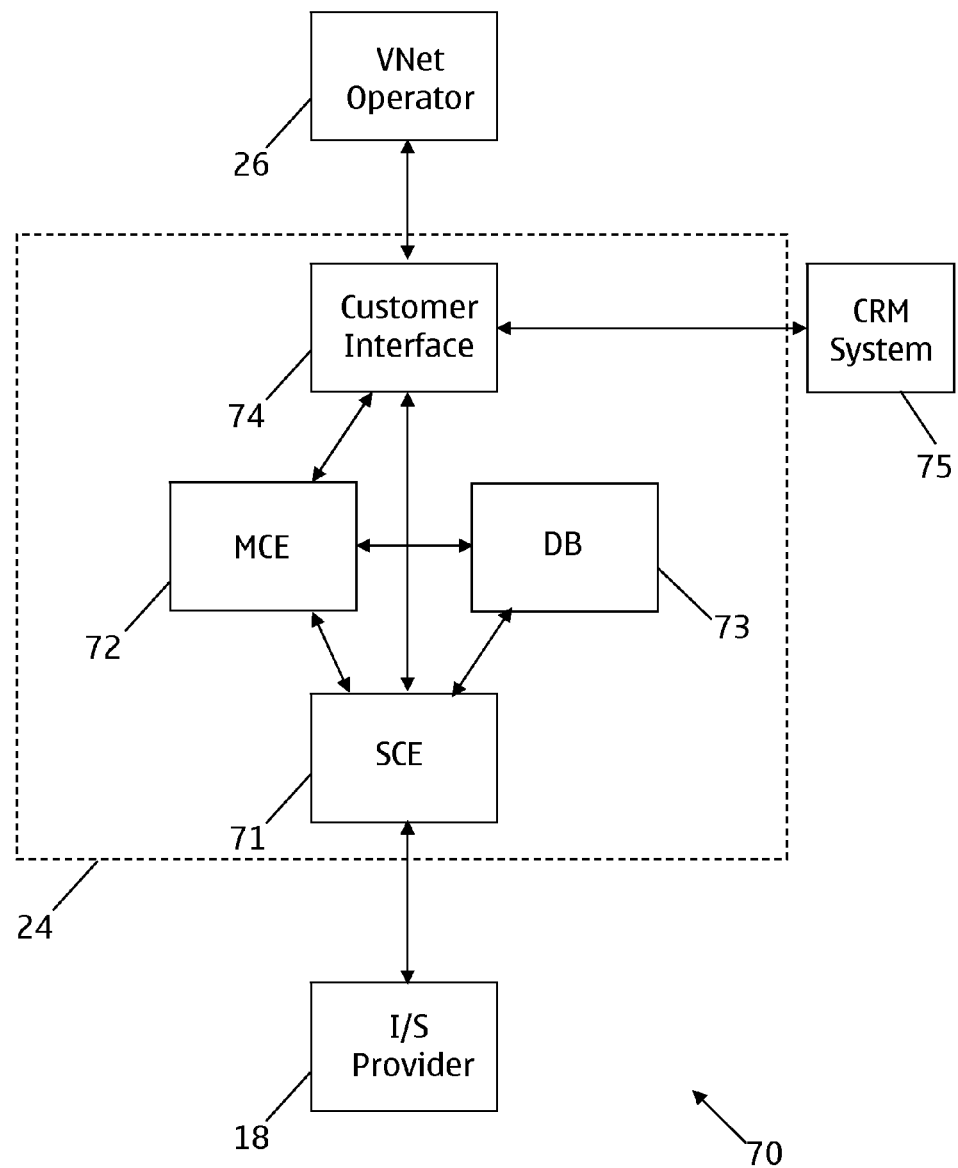
FIG. 7 is a block diagram of a system in accordance with an aspect of the present invention.

FIG. 7 is a block diagram of a system, indicated generally by the reference numeral 70, including the virtual network provider 24 described above. As shown in FIG. 7, the virtual network provider 24 comprises a slice computation engine (SCE) 71, a management and configuration element (MCE) 72, a database 73 and a customer interface 74. The SCE 71 is in two-way communication with one or more infrastructure providers (the infrastructure provider 18 is shown in FIG. 7). The customer interface 74 is in two-way communication with one or more virtual network operators (the virtual network operator 26 is shown in FIG. 7) and is also in two-way communication with a customer relationship management (CRM) system 75.

The SCE 71, MCE 72, database 73 and customer interface 74 collectively provide a Slice Computation and Management Element (SCME). The SCME obtains resources from infrastructure providers (such as the infrastructure provider 18) as necessary. This enables substantial resources to be made available to the virtual network operator 26 when required, but also saves potentially scarce network resources by enabling those resources to be released when no longer required. The SCME obtains and allocates resources automatically, i.e. without requiring input from a network engineer or the like. Of course, manual intervention is expensive. Further, the availability of engineers to provide such intervention is limited. Thus, an automated system should be more responsive, more reliable (at least in terms of availability), and cheaper. Furthermore, an automated system may also be capable of computations that were not feasible in a manual system.

The SCE 71 carries out the computations required for assigning slices, for re-optimizing slices and for up- and downgrading the network. This is discussed further below, with reference to FIG. 8.

Figure 8:
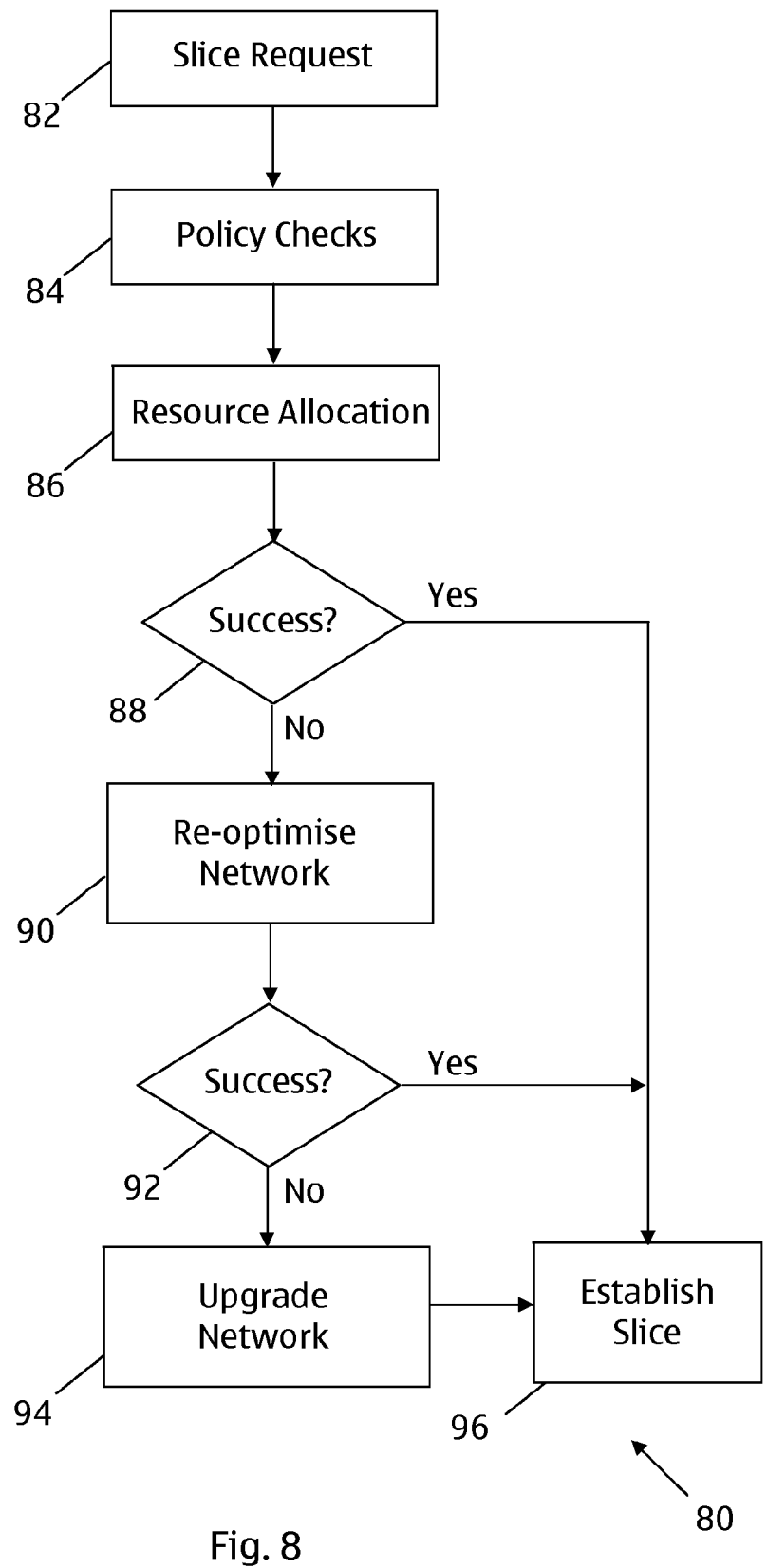
FIG. 8 shows a flow chart in accordance with an aspect of the present invention.

FIG. 8 is a flow chart of an algorithm, indicated generally by the reference numeral 80, in accordance with an aspect of the invention.

The algorithm 80 starts at step 82, where a slice is requested by a virtual network operator. The request may be handled by a web application under the control of the customer interface 74. The web application collects all data necessary to be able to understand the customer request for creating the correct slice in the virtual environment. The customer may, for example, pay a predefined fixed price negotiated in a contract for every new slice request and establishment.

Next, at step 84, the customer interface 74 checks performance policies and further contract issues (that have been negotiated with the customer in advance) by using the external CRM system 75. Assuming that this step is passed, the algorithm moves to step 86.

At step 86, the SCE 71 checks the database 73 that stores the current resource availability in the virtualized network and calculates the new slice according to that information. The SCE 71 determines whether or not the slice request can be served with the current network configuration. Depending on policies, this computation may include statistical multiplexing of different slices, i.e. the real network resources may be overbooked. The needed information for this computation is provided by the database 73. The result of the computation of the SCE 71 results either in a specification which specifies how the resources, i.e. nodes and links, have to be configured or results in a determination that the slice cannot be served by the current status of the network. If a configuration can be found, this information is sent to the MCE 72 to trigger the actual setup of the slice and a notification that the slice will be setup is sent to the customer interface 74. This computation required to set up a slice could be very simple if there is only one infrastructure provider and only one type of transport network. However, the computation could be considerably more complex in situations where there are large numbers of infrastructure providers and many types of transport networks.

At step 88, it is determined whether or not a slice can be provided. If so, the algorithm 80 moves to step 96; otherwise, the algorithm moves to step 90.

At step 90, the SCE 71 attempts to re-optimize the current slice assignments which can include multi-layer optimization (MLO). Re-optimisation may be required if, for example, insufficient resources are available even if statistical multiplexing is used. Re-optimisation needs to be carried out carefully to ensure that the obligations specified in service level agreement (SLAs) with other virtual network operators are met. Re-optimizing includes partly or fully reassigning some or all the slices to the (virtual) network resources. The needed information is provided by the database 73. One approach to re-optimising the slice arrangements might be to re-route all slices and to optimise the resource allocation. If this step succeeds, the SCE 71 sends the corresponding configuration information to the MCE 72 to trigger the re-optimization of the network.

At step 92, it is determined whether or not the re-optimization was successful. If so, the algorithm moves to step 96; otherwise the algorithm moves to step 94.

At step 94, the SCE 71 determines one or multiple scenarios regarding how the requested slice can be mapped into the network if additional resources are available. These scenarios can also include re-optimizing the network, i.e. reassigning some or all slices. For each scenario the SCE 71 determines the best solution, which normally means the cheapest one (depending on the policy), although other factors could be taken into account instead of, or in addition to, cost. This determination takes both the SLA(s) with the infrastructure provider(s) and/or direct quotations from them into account. For example, a particular virtual network provider may have long-term SLAs with infrastructure providers; alternatively new quotations may be obtained from infrastructure provides for each demand. The corresponding SLAs are stored in the database 73. After the optimal or near optimal solution is calculated, the SCE 71 asks the infrastructure provider(s) to provide the required resources. After the successful upgrade of the virtual network provider's network, the SCE triggers the MCE 72 to execute the new computed configuration which includes the re-optimization and the establishment of the new slice (step 96).

It should be noted that the re-optimization of the slices should be transparent for the virtual network operator, i.e. the virtual network operator will not see any change in its own slice. This can be realized by using dynamic switching techniques.

At step 96, the MCE 72 configures the (virtual) network elements responsible for building the requested slice and therefore establishes the slice. Either MCE 72 or SCE 71 updates the database 73. The last step is to prepare and send the delivery report to the customer and to do the billing for the requested slice in cooperation with the external CRM system 75.

Thus, the SCE 71 computes an optimal or near optimal mapping of the available (virtual) network resources to the slices, triggers the MCE 72 for the configuration of the network elements such that slices are setup or re-optimized (the needed configuration information is provided by the SCE) and automatically requests new (virtual) network resources from infrastructure provider(s), if required.

Figure 9:
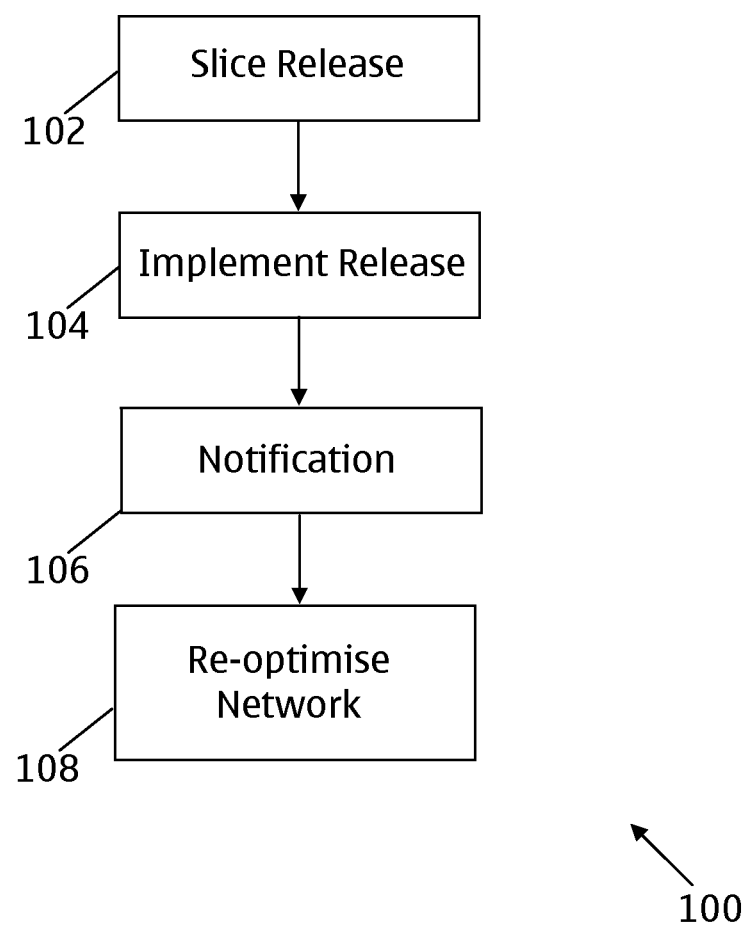
FIG. 9 shows a flow chart in accordance with an aspect of the present invention.

In addition to obtaining new slices, it is also possible to release slices. An exemplary slice release algorithm, indicated generally by the reference numeral 100, is shown in FIG. 9.

The slice release algorithm 100 starts at step 102 with a customer (i.e. a virtual network operator) asking (or instructing) the customer interface 74 to release a specified slice. Next, at step 104, the customer interface 74 triggers the MCE 72 to realise the release process. The MCE 72 configures the corresponding nodes such that the slice is released and the resources are freed. The needed information for this configuration comes from the customer interface 74 and from the database 73. Furthermore, a contract could expire, resulting in the release of a slice.

Next, the algorithm 100 moves to step 106 where the MCE 72 notifies both the customer interface 74 and the SCE 71 about a successful slice release. Furthermore, the MCE 72 or the SCE 71 updates the database 73. The customer interface notifies the relevant virtual network operators and informs the CRM 75 about this event.

Finally, depending on the policy, the SCE may try to re-optimize the slice assignment after it has received the notification from the MCE (step 108 of the algorithm 100).

As discussed above, the SCE 71 has an interface to the customer interface 74 for notification messages that a slice will be setup and notification that a computation was successful. An interface is provided between the customer interface 74 and the SCE 71 via which the customer interface can request a complete re-optimization of the current (virtual) network of the virtual network provider 24 and/or request the computation and setup of new slice(s). Normally, this is divided into two steps. First, a re-optimisation of the virtual network is done. If this is successful, then resources may have been freed so that they are no longer needed. If this occurs, the virtual network can be downgraded to release these resources.

Possible information to transmit between the customer interface 74 and the SCE 71 might include: slice spanning nodes, node connecting links, bandwidth that should be provided between the links, availability of nodes, latency and quality of service parameters, and notification that a slice mapping was successfully calculated.

Since the customer interface 74 interacts with the SCE 71 to calculate a new slice according to a given set of nodes (that are spanning the slice), similar ways to transmit the necessary information as in the path computation element (PCE) concept, i.e. PCE protocol (PCEP), can be used.

The SCE 71 has an interface to the MCE 72 for triggering the setup of slices and configuration of (virtual) network resources and for informing the SCE that a slice has been released. Possible information to transmit includes:

Configuration information for establishing or re-optimizing one or multiple slices (SCE to MCE). One possibility is to transmit this information via management information bases (MIBs) with corresponding information. These MIBs can be the same as for the communication between the MCE and network elements.

Notification that slice was released (including node ID) (MCE to SCE)

The SCE 71 has an interface to the database 73 for gathering the required information for computations. Here we see a similar information exchange as in the PCE concept between the PCE and the TED. The SCE has to know the current slice configuration, the available resources of the virtual network and the SLAs with the infrastructure provider(s) to be able to perform its tasks of calculating the optimal slice establishment and/or a possible re-optimization and/or reengineering according an upgrade of the network at the infrastructure provider(s).

Finally, the SCE 71 has an interface to the infrastructure provider(s) 18 for requesting the upgrading and/or downgrading of the network resources provided by the infrastructure provider(s).

The MCE 72 configures the (virtual) physical devices. As discussed above, the MCE 72 has an interface to the SCE 71. Over this interface, the SCE 71 sends configuration data for the setup of one or multiple slices or for the reassignment of slices to the MCE. The MCE configures the (virtual) network resources, i.e. the network nodes, such that the reassignment/setup is executed. Note that the re-optimization, i.e. reassignment, will be transparent for the virtual network operator 26, i.e. the virtual network operator will not see any change in its own slice.

The MCE 72 has an interface to the customer interface 74. Using this interface the MCE 72 informs the customer interface that a slice has been successfully setup and provides the data regarding the network resources that are used for this slice. This information can also include user credentials for login at the network nodes. Whether such information is provided depends on how the virtualization is realized in each network node and what exact access to the network nodes were requested by the virtual network operator 26. The latter information is provided when setup of a slice is requested by the SCE. If a slice should be released, the customer interface uses this interface to request the corresponding action from the MCE 72. In this case the MCE releases the slice by correspondingly configuring the network nodes. The information regarding which (virtual) physical nodes belong to this slice is transmitted via an additional interface to the database 66.

The database 73 stores all the required information the SCE 71 needs for performing the computations. The stored information includes:

Network topology. This includes all the nodes and links the virtual network provider currently administrates.

Current status of the network. This information specifies which resources are currently used and to what extent those resources are being used, typically including the absolute values, such as how much bandwidth is currently free on a link and how much bandwidth the link offers. This information is not necessarily restricted to a single layer but can also include multi-layer information.

How the slices are mapped to the (virtual) network resources. This specifies the actual mapping of the slices onto the resources, e.g. how much capacity each slice uses on each link.

Service Level Agreements (SLAs) with infrastructure providers. This specifies to which costs and with which quality of service (QoS) parameter, e.g. availability and/or latency, new network resources can be booked and also includes relevant policies with the infrastructure providers.

The database 73 can be manually configured—which is quite cumbersome—or automatically populated e.g. using the data of the network management system (NMS).

Depending on the system used to implement the database, a variety of common protocols could be used for the interface between the database 73 and the MCE 72. Possible examples include ODBC (Open Database Connectivity) and JDBC (Java Database Connectivity). Information that might be transmitted between the database and the MCE might include: which node operates which slice and data required in order to update the database after the establishment of a new slice.

The customer interface 74 is the building block which on the one hand is the interface to the virtual network operator 26 and on the other hand communicates with the internal building blocks of the SCME (the SCE 71 and the MCE 72), and with the external building blocks like the CRM system 75.

The customer interface 74 has a number of different tasks, some of which are discussed below.

The customer interface 74 has an interface with the virtual network operator 26. That interface may be realized using a web application and/or a webservice. The customer can request via this interface a new slice and can specify the locations, i.e. nodes, which should be connected and the bandwidth required. Furthermore the customer can specify additional SLA parameters, e.g. availability, latency, jitter and also the desired technology. The information about the successful setup of a slice is communicated via an interface to the MCE 72. This information (including e.g. the credentials for login) can be provided via the customer interface. A customer can also request to remove a slice via this interface, as discussed above.

An interface is provided between the customer interface 74 and the customer relationship management (CRM) system 75 for enforcing policies, e.g. for determining whether the customer has sufficient credentials for requesting a slice setup. The customer interface 74 also communicates billing information via this interface to the CRM system.

An interface is also provided between the customer interface 74 and the MCE 72. This interface can be used to enable the customer interface to trigger slice removal. Possible information for transmission includes data relating to slice release (such as the ID of the slice) and data relating to slice establishment (such as administration information regarding the slice and login data to the different nodes and possibly NMS and CP functionalities).

The MCE 72 can use Simple Network Management Protocol (SNMP) by introducing new management information bases (MIBs) or scripts that are processed by the Command Line Interface (CLI) of the network nodes for fetching information and configuring the nodes. Regarding the communication between the building blocks, the MCE would use simple function calls in the case of a centralized architecture. In the case of a distributed architecture a proprietary protocol similar to path computation element protocol (PCEP) may be used.

For updating the database 73 different mechanisms exist. The database can get the needed information either by using SNMP and directly polling the needed information from the network elements or by communication directly with a network management system which can also provide the needed information. Another possibility is that the database is updated by the MCE 72 or the SCE 71, if the MCE or SCE supports this feature.

The proposed approach described above represents a concept, which can be realized via software and/or hardware that will be responsible for the mentioned features and functionalities. The different building blocks described above can be implemented as one central box or as distributed self managed systems running on different computers. The last option also includes that some but not all of the building blocks run on the same hardware. The intensive processing power required by the SCE 71 (for example, for re-optimizing the slice architecture and for calculating optimal network upgrades based on the available network infrastructure (reengineering)) would benefit from a dedicated server.

It should also be noted that any of the building blocks can be deployed redundantly to increase the availability of the whole SCME.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. An apparatus comprising:
   a first interface with one or more entities;
   a second interface with a plurality of infrastructure providers; and
   a computation processor configured to allocate network resources available from the plurality of infrastructure providers to at least one of said one or more entities,
   wherein on receipt of a request for the provision of network resources, the computation processor is configured to determine whether or not the requested network resources can be provided on the basis of an existing network configuration and, if so, to instruct a configuration processor to provide the requested network resources,
   wherein the configuration processor is configured to receive a request to release at least some of the network resources provided to at least one of said one or more entities, and the configuration processor is configured to receive instructions instructing the configuration processor to release those resources,
   wherein the instructions for the configuration processor to release the resources are derived from at least a customer interface and a database,
   wherein the computation processor is configured to combine the network resources available from each of the plurality of infrastructure providers into a single combined set of network resources,
   wherein the computation processor is configured to split the combined set of network resources into different slices, wherein one of the network resources is split between a plurality of the one or more entities, and
   wherein the configuration processor is configured to release the different slices to the one or more entities.

2. An apparatus as claimed in claim 1, wherein, in the event that the requested network resources cannot be provided on the basis of the existing network configuration, the computation processor is configured to determine whether or not the requested network resources could be provided on the basis of existing network resources if the said network configuration were re-configured and, if so, the computation processor is configured to calculate a re-configuration of the network, instruct the configuration processor to implement the reconfiguration of the network and instruct the configuration processor to provide the requested network resources.

3. An apparatus as claimed in claim 1, wherein, in the event that the requested resources cannot be provided on the basis of the existing network resources, the computation processor is configured to determine extra resources required from at least one of said one or more infrastructure providers in order to provide the requested resources, to request the provision of those extra resources by at least one of the one or more infrastructure providers and to instruct the configuration processor to provide the requested network resources.

4. An apparatus as claimed in claim 3, wherein determining extra resources required in order to provide the requested network resources includes determining whether the network resources need to be reallocated and, if so, instructing the reallocation of said network resources prior to instructing the provision of said requested network resources.

5. An apparatus as claimed in claim 1, further comprising a customer interface, wherein the request for the provision of network resources is received at said customer interface.

6. An apparatus as claimed in claim 1, wherein determining whether or not the requested network resources can be provided on the basis of an existing network configuration includes checking details of the existing network configuration as stored in said database.

7. An apparatus as claimed in claim 1, wherein said computation processor is configured to reconfigure the network configuration following the release of the said network resources.

8. A method comprising:
receiving a request for the provision of network resources obtained from a plurality of infrastructure providers to one or more entities;
determining whether or not the requested network resources can be provided on the basis of an existing network configuration;
if the network resources can be provided on the basis of the existing network configuration, instructing a configuration processor to provide the requested resources,
wherein the configuration processor is configured to receive a request to release at least some of the network resources provided to at least one of said one or more entities, and the configuration processor is configured to receive instructions instructing the configuration processor to release those resources,
wherein the instructions for the configuration processor to release the resources are derived from at least a customer interface and a database;
combining the network resources obtained from each of the plurality of infrastructure providers into a single combined set of network resources,
splitting the combined set of network resources into different slices, wherein one of the network resources is split between a plurality of the one or more entities; and
releasing the different slices to the one or more entities.

9. A method as claimed in claim 8, further comprising:
determining, in the event that the requested network resources cannot be provided on the basis of the existing network configuration, whether or not the requested network resources could be provided on the basis of existing network configuration if the resources of the network configuration were re-configured; and
if the network resources can be so provided, calculating a reconfigured network, instructing the configuration processor to implement the reconfigured network and instructing the configuration processor to provide the requested resources.

10. A method as claimed in claim 8, further comprising:
determining, in the event that the requested network resources cannot be provided on the basis of the existing network resources, extra resources required in order to provide the requested network resources;
requesting the provision of said extra resources from at least one of said one or more infrastructure providers; and
instructing the configuration processor to provide the requested network resources.

11. A method as claimed in claim 10, further comprising re-configuring the network prior to the provision of the request network resources.

12. A method as claimed in claim 8, further comprising receiving a request to release at least some of the network resources provided to one or more entities and instructing the configuration processor to release those resources.

13. A method as claimed in claim 12, further comprising re-configuring the network resources following the release of the said network resources.

14. A method comprising:
receiving a request for a provision of network resources obtained from a plurality of infrastructure providers to one or more entities;
instructing a configuration processor to release said network resources; and
re-configuring the network resources being provided to the one or more entities following the release of the said network resources,
wherein the configuration processor is configured to receive a request to release at least some of the network resources provided to at least one of said one or more entities, and the configuration processor is configured to receive instructions instructing the configuration processor to release those resources,
wherein the instructions for the configuration processor to release the resources are derived from at least a customer interface and a database,
wherein the network resources are provided on the basis of an existing network configuration,
wherein the network resources from each of the plurality of infrastructure providers are combined into a single combined set of network resources, wherein one of the network resources is split between a plurality of the one or more entities,
wherein the combined set of network resources are split into different slices, and
wherein the configuration processor is configured to release the different slices to the one or more entities.

15. A non-transitory computer readable medium encoded with instructions that, when executed in hardware, perform a process, the process comprising:
receiving a request for a provision of network resources obtained from a plurality of infrastructure providers to one or more entities;
determining whether or not the requested network resources can be provided on the basis of an existing network configuration; and
instructing a configuration processor to provide the requested resources, in the event that the network resources can be provided on the basis of the existing network configuration,
wherein the configuration processor is configured to receive a request to release at least some of the network resources provided to at least one of said one or more entities, and the configuration processor is configured to receive instructions instructing the configuration processor to release those resources, wherein the instructions for the configuration processor to release the resources are derived from at least a customer interface and a database, wherein the network resources from each of the plurality of infrastructure providers are combined into a single set of network resources, wherein the process further comprises splitting the combined set of network resources into different slices, wherein one of the network resources is split between a plurality of the one or more entities, and wherein the configuration processor is configured to release the different slices to the one or more entities.

\* \* \* \* \*